United States Patent [19]

Chang et al.

[11] Patent Number: 5,371,358
[45] Date of Patent: Dec. 6, 1994

[54] METHOD AND APPARATUS FOR RADIOMETRIC CALIBRATION OF AIRBORNE MULTIBAND IMAGING SPECTROMETER

[75] Inventors: Sheng-Huei Chang, Millbrook; Mark J. Westfield, Hopewell Junction, both of N.Y.

[73] Assignee: Geophysical & Environmental Research Corp., Millbrook, N.Y.

[21] Appl. No.: 134,367

[22] Filed: Oct. 8, 1993

Related U.S. Application Data

[63] Continuation-in-part of Ser. No. 944,167, Sep. 12, 1992, Pat. No. 5,276,321, which is a continuation-in-part of Ser. No. 685,614, Apr. 15, 1991, Pat. No. 5,149,959.

[51] Int. Cl.$^5$ ................................................ G01J 3/50
[52] U.S. Cl. ...................................... 250/226; 250/236; 250/334
[58] Field of Search ................ 250/226, 208.1, 234, 250/235, 236, 332, 334; 348/273, 277, 281, 291

[56] References Cited

U.S. PATENT DOCUMENTS

| | | | |
|---|---|---|---|
| 4,675,532 | 6/1987 | Carson | 250/578 |
| 4,933,555 | 6/1990 | Smith | 250/330 |
| 5,047,620 | 10/1991 | Durvasula et al. | 250/226 |
| 5,132,801 | 7/1992 | Yamano | 358/213.16 |
| 5,223,703 | 6/1993 | Setani | 250/226 |

*Primary Examiner*—David C. Nelms
*Assistant Examiner*—K. Shami
*Attorney, Agent, or Firm*—Arnold L. Albin

[57] ABSTRACT

A multichannel imaging spectrometer for airborne geological, geophysical and environmental surveys in a moving vehicle. An optical scanner employs a rotating polygon allowing reduced scan optics with increased data acquisition efficiency. Multiple spectrometers integrally registered allow channelization of the received signal to optimize noise performance in the range from ultraviolet through infrared. Output data is in a form for recording and real time display. A staring mode configuration provides enhanced sensitivity by using a two-dimensional detector array and adjustable mirror orientation. A scanning mode embodiment employs a two-dimensional detector array with time delay integration and three-dimensional storage of temporal spatial data and spectral wavelength and intensity. Thus, all channels are acquired simultaneously, resulting in perfect band-to-band registration with continuous spectral curves over the field of view. On-board real-time absolute radiometric calibration is provided by an integral reflective white plate and radiometrically and spectrally calibrated light source illuminating a column of detectors independent of illumination by the target during the scan cycle. Dark current measurement is achieved in both the scan and stare modes by an auxiliary detector column.

11 Claims, 12 Drawing Sheets

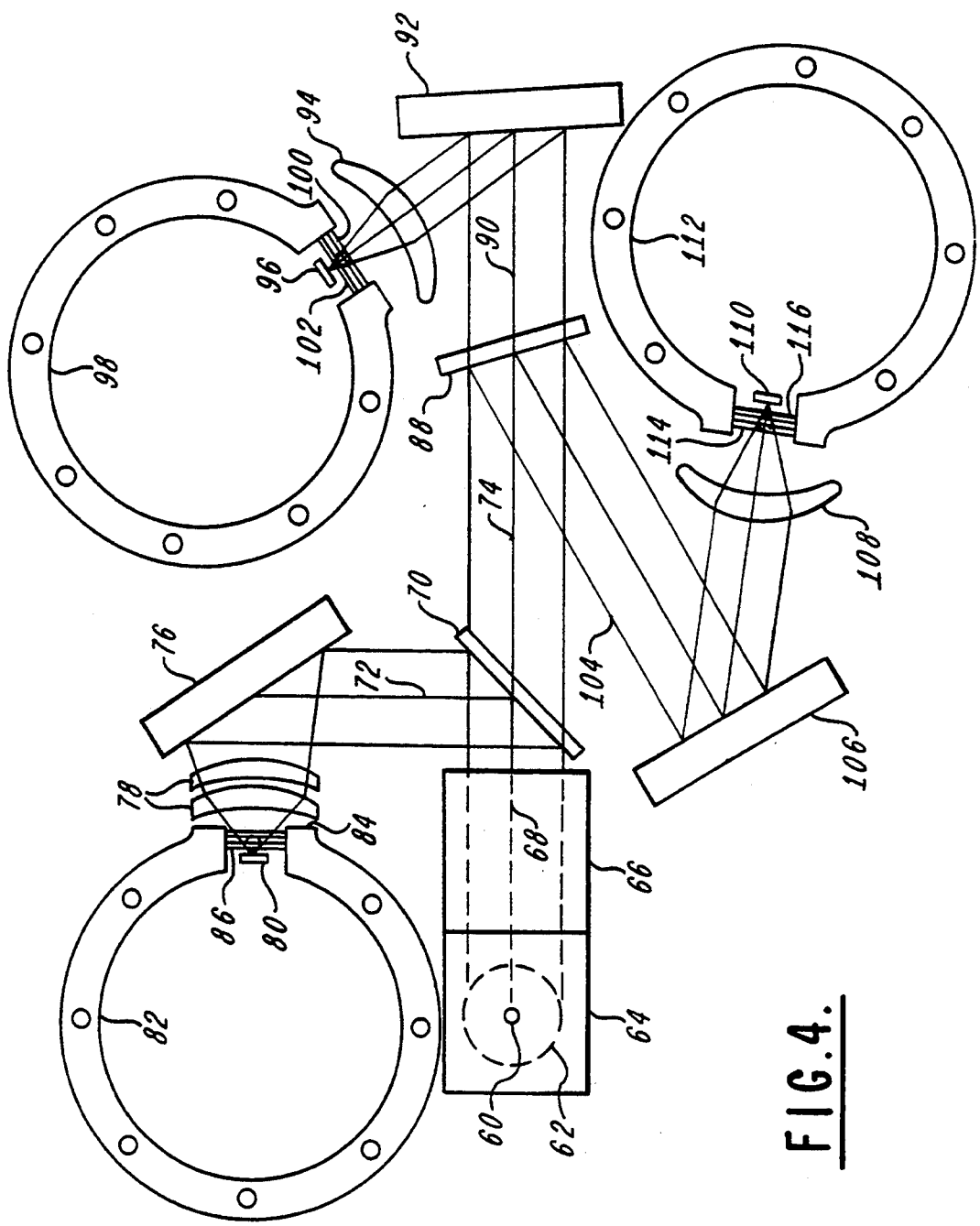

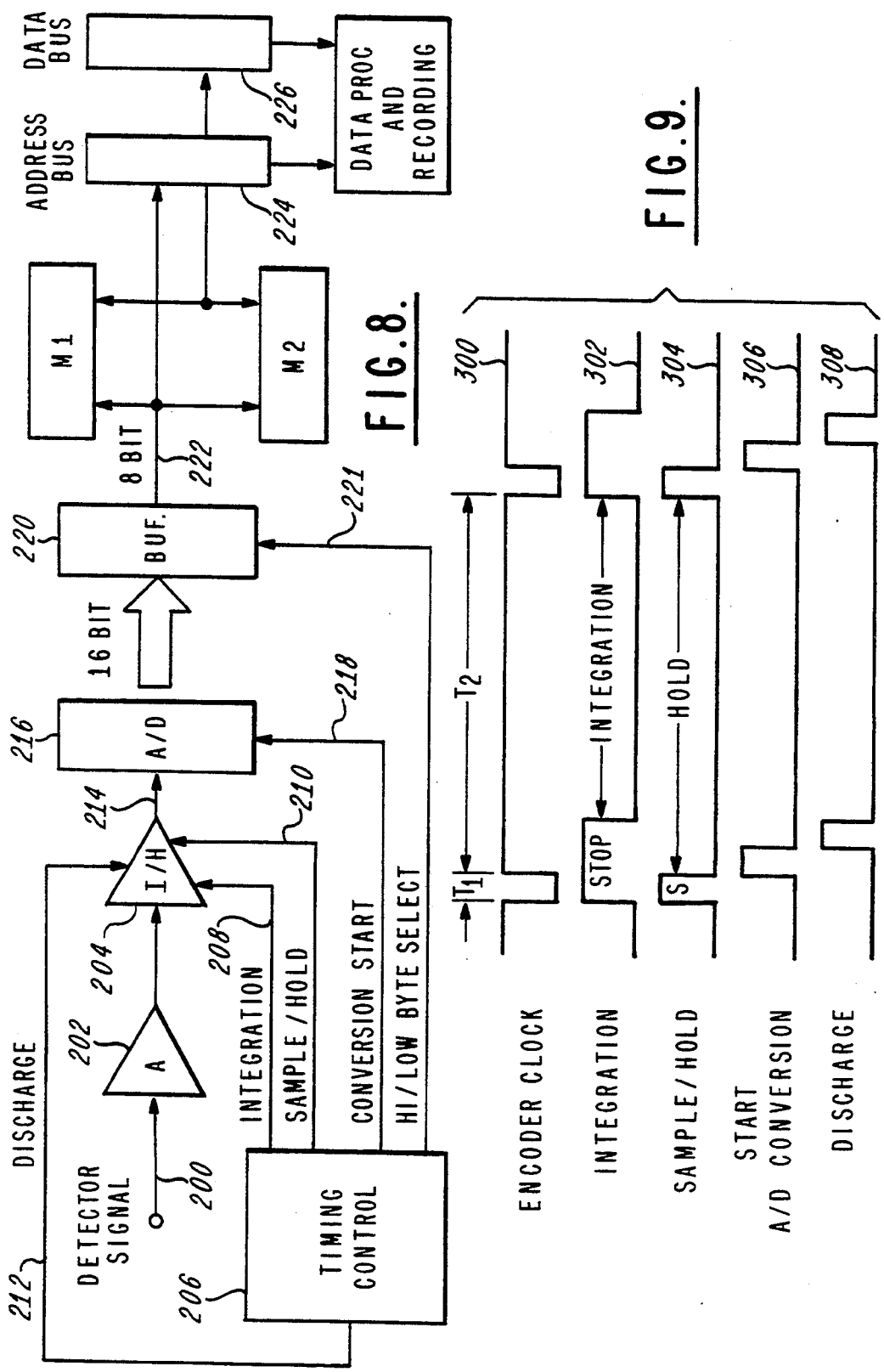

METHOD AND APPARATUS FOR RADIOMETRIC CALIBRATION OF AIRBORNE MULTIBAND IMAGING SPECTROMETER

This application is a continuation-in-part of U.S. pat. Ser. No. 07/944,167, filed Sep. 12, 1992 now U.S. Pat. No. 5,276,321, which is a continuation-in-part of Ser. No. 685,614 of U.S. Pat. No. 5,149,959, filed Apr. 15, 1991.

BACKGROUND OF THE INVENTION

1. Field of the Invention

The invention relates generally to spectrometers, and more particularly to an apparatus for providing real-time radiometric calibration of narrowband radiometry utilized for real time detection, recording, and display of mineralogic spectra in the form of radiated and reflected emissions for airborne geological investigations.

2. Description of the Prior Art

An airborne system for geographical surveys of the earth's surface using a high spectral resolution remote sensing instrument is described by W. E. Collins and S-H. Chang in "The Geophysical Environmental Research Corp. 63 Channel Airborne Imaging Spectrometer And 12 Band Thermal Scanner", SPIE Vol. 1298, pp. 62–71, Apr. 16–17, 1990. The GER imaging spectrometer covers 0.4–2.5 um in 63 channels of varying bandwidth. Both visible light and infrared detection is provided. Scanning optics utilize a rotating polygon mirror which scans the ground four times per revolution, allowing a factor of four reduction of rotation speed to scan speed. The spectrometer design provides for permanent registration between channels without adjustment. All 63 detectors have parallel preamplifiers and analog-to-digital converters. No switching or multiplexing of the detector outputs is used. A 12 bit or greater analog to digital converter permits a system providing high dynamic range with no on-board gain adjustment required. Multiple data channels may be displayed in real time during flight and recorded for later data reduction.

The present invention discloses an improved model of the GER 63 channel scanner with the capability for up to 640 channels over a range of 0.35 um through 20 um. In this embodiment a technique referred to as line or one-dimensional spectroscopy is utilized, in which radiated or reflected energy ranging from ultraviolet to infrared emanation from a terrain under observation is collimated and dispersed by diffraction gratings to provide a line image spectral display. There is a direct correlation between the detected line images and the physical configuration of the radiation source. By scanning over the surface of the terrain in a moving vehicle, preferably an aircraft, a spectral map can be obtained.

A rotating mirror is disposed to form a line image transverse to the flight path of an aircraft carrying the apparatus. For maximum spectral resolution, a plurality of spectral bands with corresponding line array detectors are provided. However, as the bandpass of a given spectral band is narrowed to provide enhanced resolution, there results an increase in attenuation of the perceived spectral energy. Further, the scanning mirror intercepts only a fraction of the available energy at any instant, thereby limiting the threshold sensitivity of the apparatus.

A further improvement provides means for generating a line image with the mirror fixed at a predetermined angle with respect to the observed scene, in what is referred to as a "staring" or "pushbroom" mode, in which the apparatus generates a field of information without relative motion between the scan mirror and the detection array, relying on the translation of the mirror and a two-dimensional array of imaging elements with respect to the terrain. Further, by scanning the terrain at a plurality of fixed mirror angular positions, data with respect to polarization of the spectral emissions may also be obtained.

In a further improvement, the scene is scanned by the rotating mirror and the image sequentially applied to the two-dimensional array so as to generate a continuous three-dimensional spectral display, in which the spatial data and spectral distribution with respect to wavelength are correlated over a substantially contiguous spectrum, while providing enhanced sensitivity and increased dynamic range over a wide field of view.

Prior art spectrographic imagers utilizing two-dimensional detection arrays are incapable of providing a continuous spectral distribution along with a continuous image display, allowing only a continuous image with selective spectral bands, or a continuous spectrum over a limited image capture swath.

Further, prior art spectrographic imagers required pre-flight and post-flight calibration with standard light sources. The prior art has attempted real-time calibration by scanning a white plate reflective target and a plurality of black body targets at the extremes of the field of view. However, disadvantageously, responsivity is frequently nonuniform over the spectral band due to the combined effects of the spectral characteristics of the mirrors, lenses, prisms, gratings and detectors. Further, such a procedure was inoperative in the staring mode. The present invention provides an on-board real-time calibration capability, utilizing a white body reflective plate or black body absorber and a radiometrically and spectrally calibrated light-emitting source providing at least one predetermined wavelength of known radiance, and wherein calibration data is recorded during each line scan of the detector array in the scan mode, and during each pixel scanned in the staring mode.

SUMMARY OF THE INVENTION

The present invention provides an imaging spectrometer particularly adapted for low altitude, low speed airborne applications to geophysical, geological and environmental surveys. It provides a continuous digital readout from each detector channel. In a preferred embodiment it comprises an optical image assembly including a wide angle rotating mirror having a plurality of reflective surfaces for providing a substantially continuous image with respect to time of radiant spectral emissions in a predetermined angular field of view. The spectrometer comprises a beam splitter, located in the output of the optical path of the collimating lens, which divides the spectral emissions into two contiguous bands having different predetermined wave lengths. A second fixed mirror is used to direct each of the first and second bands of spectral emissions to their respective frequency selective optical elements. The frequency selective optical elements act selectively upon the spectral emissions impinging thereon and provide a predetermined angular dispersion of the spectral emissions at different predetermined wavelengths. The number and bandwidth of these dispersed emissions have been selected to maximize the detection threshold.

The detectors are comprised of a plurality of photoresponsive sensing elements configured in a two-dimensional array. The detectors may employ photovoltaic or photoconductive detection, depending on the desired spectral response and noise characteristics. Each of the sensing elements is designed to respond to a given bandwidth of spectral emissions. Columns of detector elements are spatially disposed for alignment with one of the angularly disposed spectral emissions, while rows correspond to spatial direction. Thus, each detector provides a signal representative of a given spectral emission amplitude as a function of wavelength and image position. The frequency selective optical elements and corresponding detectors cooperate in alignment to maintain registration of the angularly disposed spectral emissions with predetermined ones of the detector sensing elements, without the need for inflight adjustment.

The detector outputs are directed to a signal processor, which synchronously integrates successive rows of detector signals, the output of each row being periodically directed to an analog-to-digital converter. Each detector element is processed in parallel, thereby to provide a continuous signal output in digital form at each of the sensed spectral frequencies. The detected signal output is periodically sampled in synchronism with rotation of the rotating mirror and thereby provides an updated pixel-by pixel sample as each of the reflective surfaces traverses an angular field of view.

The improvement comprises a method for absolute radiometric calibration during data acquisition for a spectrographic detector array, the array arranged in a matrix of rows and columns, comprising providing a first linear detector array proximate to a first column of the spectrographic detector array, providing a second linear detector array proximate to a second column of the spectrographic detector array and distal to the first column, providing cover means for denying illumination to the first linear detector array, thereby to establish a dark current reference level, providing illumination from a radiometrically calibrated light source to the second linear detector array, sequentially sampling the detected output of the first and second linear detector arrays along the first and second columns in cooperation with spectral excitation of the spectrographic array, so that corresponding sensor elements of a given row of the spectrographic array are temporally calibrated by associated sensor elements of the linear detector arrays in the given row, and recording the signal levels developed by the linear detector arrays.

The method is applied wherein the spectrographic detector array has a predetermined number of sensor elements in each column, and wherein the first and second columns of linear detector arrays have a one-to-one correspondence of sensor elements with the predetermined number of sensor elements.

BRIEF DESCRIPTION OF THE DRAWINGS

FIG. 4 is a schematic diagram illustrating a cross-sectional planar view of an exemplary spectrometer in accordance with the present invention.

FIG. 8 is a schematic block diagram illustrating processing of a detected optical signal.

FIG. 9 is a timing diagram useful in understanding the operation of the system of FIG. 8.

DESCRIPTION OF THE PREFERRED EMBODIMENTS

Figure 1:
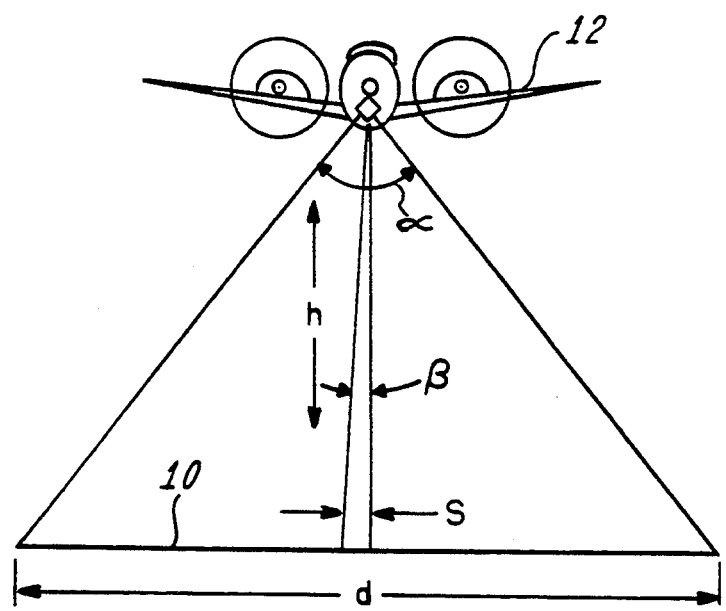
FIG. 1 is a view showing scan angle and field of view of an airborne scanning apparatus.

Referring now to FIG. 1 of the drawings, there is shown a view of the scan angle and field of view of an airborne imaging apparatus of the present invention. Radiant energy at various wavelengths is reflected from terrain 10 and is received by an imaging system located in aircraft 12. Typically, in an aircraft flying at 110 mph at an altitude of h of 20,000 ft and a scan angle of 90 degrees the field of view d is approximately 40,000 ft or 7.6 mi. With an aperture size of 0.5 mm a picture element (pixel) defined by the instantaneous field of view (IFOV) $\beta=3.3$ mRAD will yield a ground spot size $S=20$ m$\times$20 m square. Other aperture sizes will yield correspondingly proportional IFOV and ground spot sizes.

Figure 2:
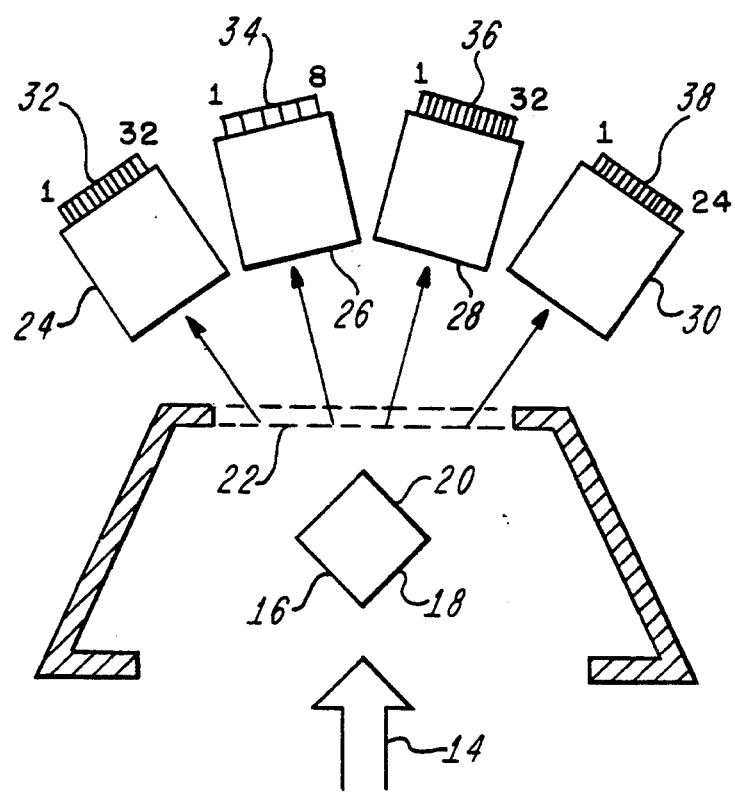
FIG. 2 is a conceptual sectional view through the optical system, useful in understanding the invention.

FIG. 2 is a conceptional sectional view through the optical system. Radiant energy 14 is incident upon the faces 16 and 18 of a mirrored polygon 20. Mirrored polygon 20 is adapted for rotation at a scan rate variable between 5 and 50 revolutions per second. Pairs of folding mirrors (not shown) direct the reflected electromagnetic energy through an aperture 22 (not to scale) where the light is directed through an array of mirrors and splitters to a plurality of spectrometers 24, 26, 28, 30. The operation of the rotating reflecting polygon and folding mirrors is such that the aperture stop is the sum of the two areas projected on faces 16 and 18. Since, in the preferred embodiment, the polygon mirror scans the ground four times with each rotation, it provides an effective scan rate one fourth that of an equivalent single rotating mirror type scanner. This is a very important feature for achieving bandwidth limited noise effective temperature change (NEΔT). The slower the scan rate, the lower NEΔT can be achieved, resulting in greater detection effectiveness. Each spectrometer is equipped with a bandpass filter and a plurality of detector elements 32, 34, 36, and 38 which may range from one to 128 to provide up to 128 corresponding channels and with a variable bandwidth optimized to provide the highest practical signal-to-noise ratio for the desired wavelength. The modular system design allows for the system to be easily adapted to a specific application from the broadest needs of the full spectrum (0.35 um to 20 um) to specific thermal, infrared, visible, or ultraviolet wavelengths. In one representative embodiment, spectrometer 24 was designed for response in the visible and near infrared wavelength range, and provided a 32 element detector array utilizing a bandwidth 20 nm for each of 32 channels. A near infrared spectrometer 26 provided an array of 8 detectors of 50 nm bandwidth and covers the wavelength range of 1.4–1.8 um. Spectrometer 36 is adapted for the infrared region from 2.0–2.5 um and utilizes 32 detectors each having a nominal bandwidth of 15 nm. Spectrometer 30 is adapted for the far infrared region and may be provided with a 24 element detector array, covering 8–12 um, each channel occupying a bandwidth of 0.2 um. The technology also permits providing an array in the 3–5 um wavelength, with channels of the order of 0.4 um. It may be seen that the bandwidth of each spectrometer and each detector element in the detector array may be particularly adapted to provide optimum performance in the desired frequency spectrum by selecting a channel wavelength and bandwidth which is most likely to resolve the desired features, such as, for example, the spectrum signature of particular forms of mineral deposits. A spectrometer apparatus particularly adapted for thermal scanning in shown in FIG. 4 and will be discussed below.

Figure 3:
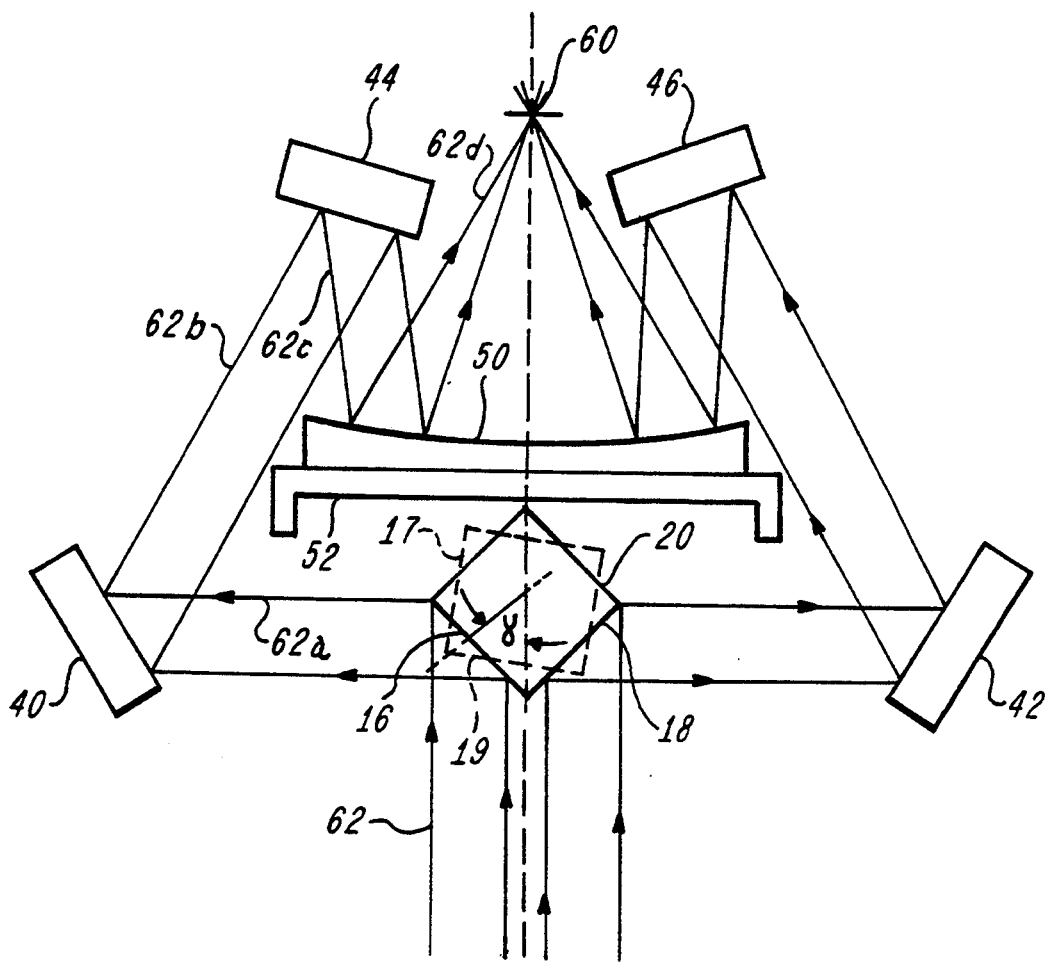
FIG. 3 is a sectional view through the scanning optics of the present invention.

Referring now to FIG. 3, the split-field scanning system utilizing a rotating reflecting polygon is shown in detail. The system is equipped with a plurality of folding mirrors 40, 42, 44, and 46. In the initial position of polygon 20, shown by the solid lines, a light ray 62 is reflected from surface 16 to folding mirror 40, which is angularly disposed at approximately 60 degrees. Light ray 62a is reflected from mirror 40 as ray 62b. Ray 62b in turn is reflected from mirror 44, which is preferably at an angle of 15 degrees with respect to the horizontal, to produce reflected ray 62c. Reflected ray 62c impinges upon the concave surface of concave reflector 50 and the resultant ray 62d appears at aperture 60. In a similar manner, light rays impinging on surface 18 of reflecting polygon 20 are directed by folding mirrors 42 and 46 to concave mirror 50 and then to the aperture 60. The aperture stop area is the sum of the two projected areas, which has a value of 2A at the position shown, where A is the area of a face of the polygon. As the mirror rotates through an angle $\gamma$ as shown by the dotted line, mirror face 16 rotates to position 17 and mirror face 18 rotates to position 19. As the mirror rotates to the angle $\gamma$ from one position to the other, one side has a projected area of A cos $\gamma$ and the second side has a projected area of A sin $\gamma$. Thus, the total area is A (cos $\gamma$+sin $\gamma$). Mirrors 40 and 42 must be positioned such that they provide a reflecting surface from the axis of the polygon to the entrance aperture. Thus, when polygon 20 rotates 30 degrees from the vertical position, rays 60 degrees from the vertical will enter the system. In this manner, the rotating polygon provides substantially continuous coverage over a 90-degree scan angle.

Since each side of the polygon is used for ¼ of the rotation, if there is no vignetting by the mirrors, the scan efficiency will be close to 100%. As heretofore observed, the use of a four-sided mirror allows the scan rate to be reduced by a factor of four which in turn permits a reduced system bandwidth and enhances the signal-to-noise ratio.

A spectrometer configuration which has been optimized for the thermal spectrum, but which is typical of the application for other wavelengths, is shown in FIG. 4.

Reflected and transmitted radiation from the terrain is received by the imaging optics and focused upon the aperture 60, which as heretofore described, is adjustable for a pre-selected instantaneous field of view. The optical image is directed to collimating lens 62 for providing a collimated output thereof. Aperture 60 is positioned outside the focal length of collimating lens 62. This has the effect of slightly decollimating the centrally directed incident rays, but encompasses and collimates the normally aberrated edge rays so as to collect the maximum possible optical flux. The collimated output is applied to a mirror 64, which is inclined so as to transmit reflected energy to a first splitter 66. Splitter 66, which may be a conventional dichroic mirror, is adapted for providing at least first and second bands of spectral emissions having different predetermined wavelengths. The individual channel wavelengths may be adapted for contiguous or noncontiguous coverage, in accordance with the survey objectives. For clarity, only one of the first and second bands is shown in FIG. 4, that being the thermal wavelength range, it being understood that a second wavelength band may be directed to a further spectrometer (not shown) for analysis in other wavelengths as in the visual range. Accordingly, the transmitted rays 68, which are representative of the thermal emission spectra, impinge upon a second splitter 70. While splitter 66 is adapted for dividing the collimated output into the visible wavelengths and the infrared wavelengths, splitter 70 is designed to provide a first subband 3–5 um, as denoted by rays 72 and second and third subbands 8–10 um and 10–12 um denoted by rays 74. It will be clear to one skilled in the art that these values are merely exemplary and not limiting. Considering first rays 72, splitter 70 is oriented as so to direct these rays upon a diffraction grating 76 which is constructed with a suitable blaze angle and angle of incidence for disbursing the incident spectral emissions over a predetermined angular dispersion at different predetermined wavelengths. A focusing lens 78 operative at high efficiency in the 3–5 um wavelength range focuses the diffracted rays upon a line detector array 80 through an optically transparent window 84. Line detector array 80 may be comprised of at least three individual sensing elements, each responsive over a 1 um bandpass. Detector array 80 is housed within a Dewar container 82 and cooled by liquid nitrogen so as to maintain detector array 80 at a predetermined low temperature, essential for low-noise operation. A bandpass filter 86, to be described with respect to FIG. 6, assures adequate skirt selectivity and attenuates any undesired out of band transmittance by grating 76.

Facing beam 74 of splitter 70 is a further splitter 88 which transmits a portion 90 of the incident rays, preferably in the suband region 10–12 um, to a second diffraction grating 92. Diffraction grating 92 is designed so as to disperse the incident rays upon a focal lens 94 and produce an image which is focused upon a second detector array 96. Detector array 96 is preferably a 12-element linear array whose sensing elements are individually responsive over the band of 10-12 um. Note that the individual bandwidths are narrower that those of detector array 80 in order to optimize the signal-to-noise ratio. A Dewar 98, window 100, and filter 102 are further provided. Filter 102 is adapted for attenuating frequencies outside the desired band of 10-12 um.

Splitter 88 further directs a third subband of spectral emissions over the wavelength 8-10 um denoted by rays 104 to a third diffraction grating 106. Grating 106 disburses the incident rays which are focused by a lens 108 upon a third detector array 110. Diffraction grating 106 is adapted for operation in the 8-10 um wavelength band. Detector array 110 is enclosed within Dewar 112 which is supplied with an optical window 114 and further equipped with a filter 116 for excluding frequencies outside the bandwidth of 8-10 um. Linear detector array 110 is preferably a 12-element array.

Because of the wide frequency range covered, and the necessity for maintaining the noise threshold at extremely low values, while attaining high optical efficiency, careful choice of the optical materials and an integration of the respective components is essential. Thus, the lens design criteria must consider an appropriate spot size for the detector size, the best dispersion, appropriate energy density transfer from grating to detector, transmission bandpass, and must deal with aberrations to enhance system performance. Because of the designed bandpass requirements, the collimating lens 62 must cover a bandpass of 0.6-12 mm and is preferably comprised of zinc selenide and coated to provide optimal optical characteristics. Such lenses are commercially available from optical specialty houses. Similarly, lens 78 is preferably comprised of zinc selenide for use in the 3-5 um wavelengths. Lenses 94 and 108 may be comprised of germanium. The visual range spectrometer (not shown) may utilize conventional optical grade glass or quartz. Splitter 66 is designed to reflect the visible light wavelengths and transmit the infrared, in a conventional manner. It should be noted that the number and bandwidth of the dispersed spectral emissions has been selected to maximize the detection threshold for a given noise equivalent temperature difference. This is discussed below with respect to FIG. 5. The sensing elements of the detectors are incrementally spaced in proportion to a given wavelength to which each of the elements is responsive so as to provide a signal representative of a given spectral emission amplitude as a function of wavelength. The diffraction gratings and corresponding detectors are aligned in cooperation to maintain registration of the angularly disposed spectral emissions with predetermined ones of the plurality of sensing elements. Note that the angle of incidence of the gratings defines the angle of dispersion and width of the dispersion field. It must be optimized to provide registration of the disbursed emissions with the spacing of the detector sensors. Note also that each linear detector array is graduated so that the detectors with a fewer number of elements have a smaller cold shield, as described below. The optical elements are further provided with appropriate coatings to maximize transmission over the designed bandpass. The diffraction gratings, in particular, are gold coated. Detectors in the visible range with wavelengths less than 3 um may be comprised of silicon. In the range of 3-5 um either lead sulfide (PbS) or, preferably, indium antimonide (InSb) may be used. A detector comprised of mercury-cadmium-telluride (Hg Cd Te) is preferred for the 8-12 um wavelengths. Note that the filters are placed directly on top the detectors and serve to enhance the band separation provided by the optical splitters, but are not utilized to define a specific frequency channel. A cold plate (not shown) is placed on top of the filters. Cold plates are masks provided to restrict the field of view of the corresponding sensing element in a cooled detector to cut down on extraneous background photons and thus reduce noise. Narrowing the effective field of view of the detectors improves responsivity.

The embodiment of FIG. 4 utilizes reflecting and dichroic mirrors 66, 70, 88 and reflective gratings 76, 92, 106 for selectively directing predetermined spectral emission frequencies to associated detectors whose response characteristics cooperate with the applied spectral emissions to optimize detector efficiency. However, it is known that other optical elements are interchangeable with the elements of FIG. 4. Thus, frequency selective optical elements, such as a grating, dichroic mirror, or prism may be utilized as beam splitters for elements 66, 70, 88, while non-dispersing prisms and reflecting mirrors may be used in place of reflective gratings 76, 92, 106. Further, an array of frequency selective filters may also be utilized, at some loss in optical efficiency, to selectively apply given spectral emissions to predetermined detectors.

Thus, FIG. 4 may be viewed as a generic illustration with respect to the configuration shown, but is not to be construed as limiting as to the optical elements depicted therein.

Figure 5:
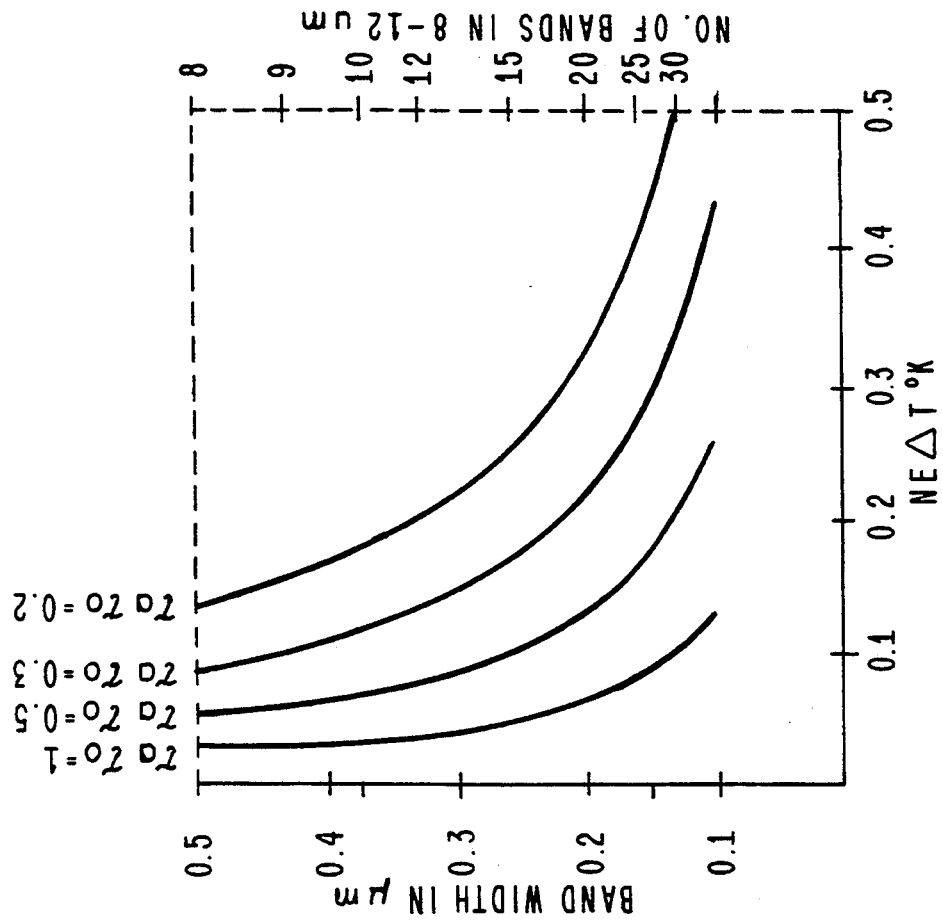
FIG. 5 is a graph presenting bandwidth optimization data as a function of atmospheric transmissibility and noise-equivalent temperature change (NEΔT).

Referring now to FIG. 5, there is shown a family of curves for determining the optimum channel bandwidth and number of bands as a function of transmission loss and noise equivalent temperature change, which latter factor in turn is a function of the electronic bandwidth and hence of the scan rate of the rotating mirror. Referring to FIG. 5, the lefthand ordinate is scaled in units of optical bandwidth; the righthand ordinate is scaled in terms of the number of bands in the 8-12 um frequency range; the abscissa is scaled in terms of noise equivalent temperature change in degrees Kelvin; and the product of optical and atmospheric transmission is a variable parameter. With an electronic bandwidth of 50 Khz, the spectrometer will have a grating and lens system which has been computed to provide $\tau_a\tau_o=0.2$ as a lower limit. This will put the NE$\Delta$T at 0.33 degrees k with 15 bands. If the scan speed is limited to 10 scan/sec, a bandwidth of 20 Khz will permit achieving a noise equivalent temperature change of 0.2° K. with 15 bands. This will provide a signal-to-noise ratio of about 250. An airborne thermal scanner based on the present design concepts, with 6 channels in the 8-12 um region, each with a 0.5 um bandwidth, has been demonstrated to provide a signal-to-noise ratio of approximately 500 at 0.1° K. in NE$\Delta$T. This was obtained with the following technical specifications:

(1) Detector size Ad=0.037 inch×0.037 inch=0.094 cm×0.094 cm.
(2) Effective optical collecting surface A=139 cm$^2$.
(3) Bandwidth: B=50 Khz.
(4) IFOV:=6 mrad.
(5) Detector: D*=5×10$^{10}$ cmW$^{-1}$ Hz$^{\frac{1}{2}}$.
(6) $\tau_a$: Atmospheric transmittance.
(7) $\tau_o$: Optical transmittance.

Figure 6:
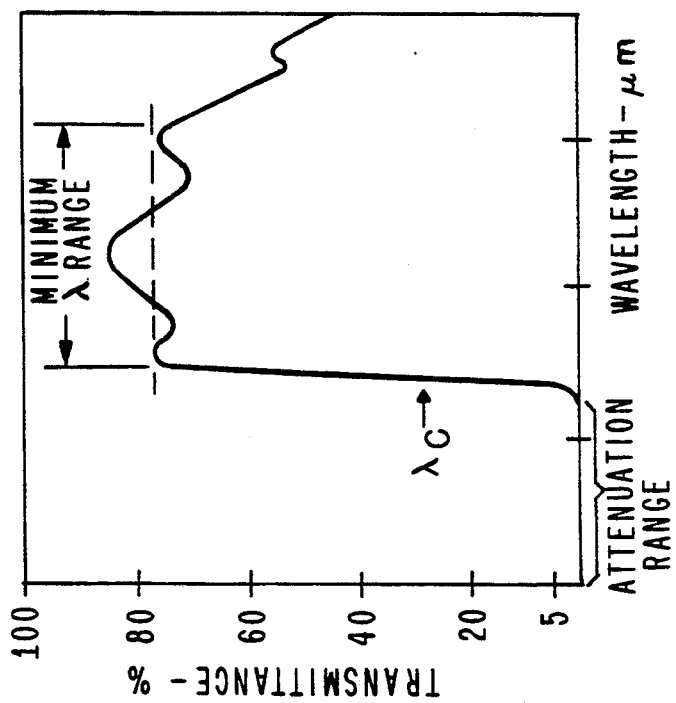
FIG. 6 is a graph presenting bandpass transmittance data for an optical filter which is useful for filtering spectral emissions.

FIG. 6 shows a typical transmittance curve of longwave bandpass filters. Such filters transmit energy at longer wavelengths than $\lambda$, the cuton frequency. Energy below the cuton is rejected. The cuton wavelength denotes the 5% transmittance point. The dashed line denotes the average percent transmittance within the pass band and typically ranges from 70 to 95 percent.

Figure 7:
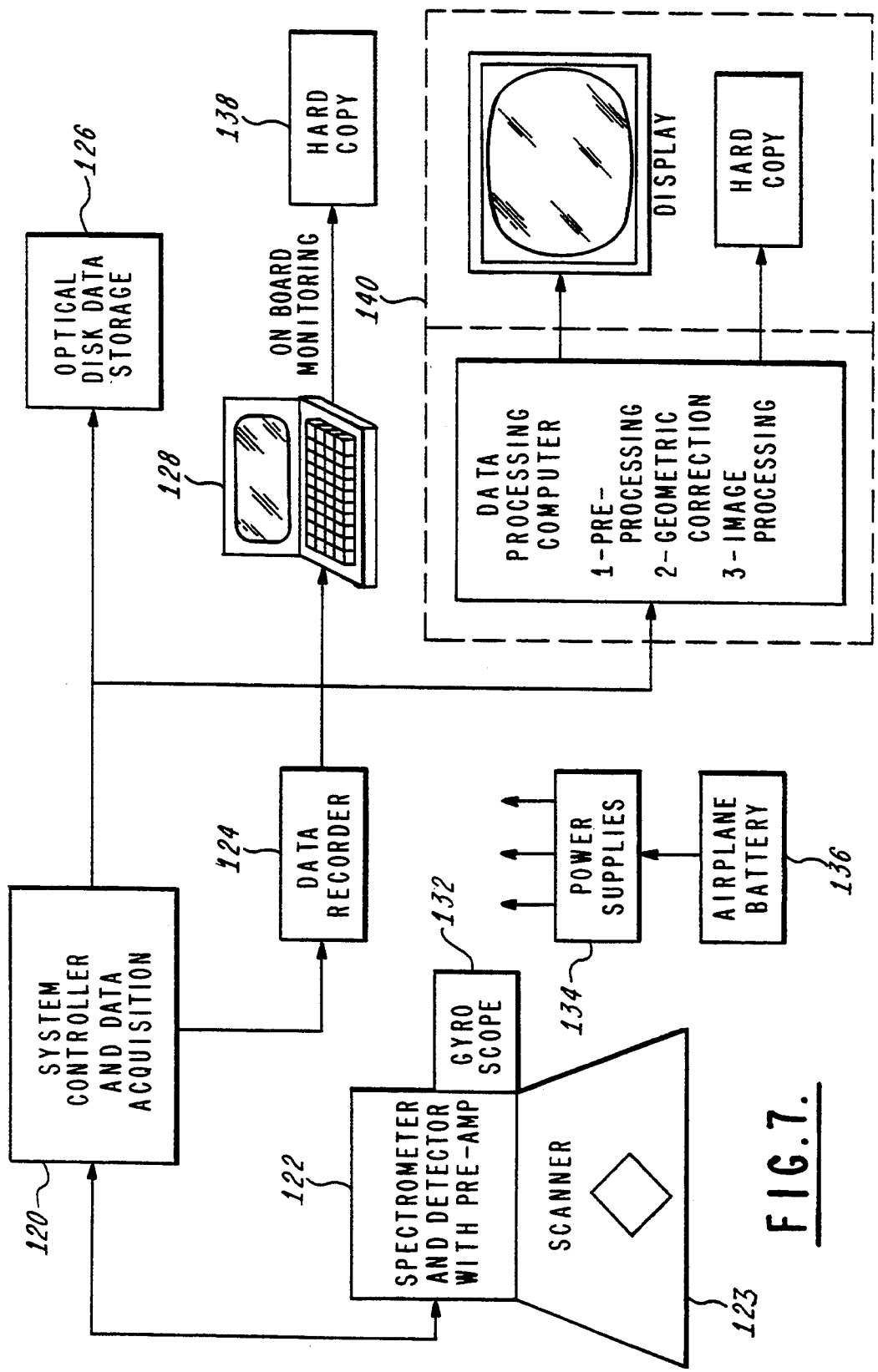
FIG. 7 is a schematic block diagram illustrating a multispectral imaging and display system of the present invention.

FIG. 7 shows the imaging spectrometer and placement of the major subsystems including the optical scanner, spectrometer, detector and preamplifiers, system controller and data acquisition, disk data storage, onboard monitoring, and ground data processing computer. The apparatus is operated under the control of the system controller and data acquisition unit 120 which interfaces with the spectrometer and detector 122, scanner 123, gyroscope 132, data recorder 124, storage unit 126, onboard monitoring display 128, hardcopy recorder 130 and, optionally, ground data processing computer 140.

Viewing of the scene is done with the scanner 123 operating at the rate of 5 to 50 scans/sec. Up to 720 data channels from a plurality of spectrometers are read simultaneously from the scanner. Each detector has a separate amplifier and A/D converter, to provide all parallel data acquisition channels, as will be described. The system controller and data acquisition module 120 accepts data in analog form from the detector arrays 122, converts them to a 16-bit digital format and records it on a data recorder 124, which may be a tape unit or optical disk data storage 126. The controller 120 also supplies the scan motor and gyroscope with proper operating and synchronization signals. The onboard monitor 128 provides a real time display of up to three onboard bands per monitor window. Preferably, the data will be in industry standard format. Since all detectors operate in parallel, without multiplexing, and all channels are acquired simultaneously, there results perfect band-to-band registration and continuous spectral curves for each pixel. Any conventional recorder with suitable frequency response and recording time capability will be suitable. A typical 2400 ft digital tape can record up to 2000 scan lines for the 64 channel embodiment with the total amount of data in one tape exceeding 130 Mbyte. An erasable optical disk storage unit 126 is also suitable. Computer 128 may be an MS-DOS compatible machine or workstation, utilizing a state of the art commercial microprocessor to provide adequate processing speed and capacity. A disc drive of 1.2 Gbyte storage capacity for processing the imaging spectrometer data is suitable. The data are written by the scanner 123 on the digital tape in a packed format. The computer 128 reads the data, decodes the format and than creates a disk file. The zero level is recorded at the end of each scan. For each scan line on tape 32 pixels of zero level data will be recorded. These zero level data are averaged and then subtracted from the image data and the results written to disk as one file for each channel. Gyroscope 132 provides aircraft roll information pixel-by-pixel, which is recorded on an available channel.

For pre-flight and post-flight radiometric correction, the scanner may be set up in a laboratory and calibrated with a standard lamp. This provides a radiance correction factor for each channel. A radiance spectral curve for each pixel can than be produced by applying these factors to the raw data.

Optional computer 140 is used for ground data processing. Geometric correction, data compression, data conversion and any other needed data processing procedures can readily be applied and visually displayed or recorded for future interpretation.

Referring now to FIG. 8, an exemplary electronics unit suitable for data acquisition with the subject invention is illustrated. Signal 200 from a detector is applied to amplifier channels 202, and integrated and applied to integrator and sample and hold circuit 204. Integrator and sample and hold unit 204 receives control signals from timing control 206 on leads 208 and 210. A further control signal for discharging the sample and hold circuit is applied on lead 212. Circuit 204 is coupled on lead 214 to A/D converter 216. The conversion process is initiated by a control signal from timing control unit 206 on lead 218. The output of A/D converter 216 is a 16-bit data train which is applied to a buffer 220. Buffer 220 in a manner to be described provides an 8-bit parallel output on lead 222 to ping-pong memories M1 and M2. The outputs of the ping-pong memories are applied to address bus 224 and data bus 226 for subsequent recording and processing.

The operation of the circuit of FIG. 8 can be understood by referring to the timing diagram of FIG. 9. Timing control 206 provides an encoder clock signal which has an active low period $T_1$ of approximately 1.0 us and a quiescent period $T_2$ which varies with the number of pixels in a scan interval and the mirror rotational speed. Typically, with 512 pixels/scan the sample rate would range from 5 Khz to 50 Khz in accordance with an optical scan rate of 5 to 50 scans/sec. The interval between encoder clock pulses represents the scan time of one pixel. Since the detector output is continually varying during the scan cycle, the integrator embodied in circuit 204 provides a continuous output signal which is incremented with time. The sample rate then will define an average pixel amplitude and a period controlled by timing waveform 304. The sample period than is coincident with the encoder clock frequency. Analog-to-digital conversion is initiated at the completion of the encoder clock pulse and is followed by a discharge signal denoted by waveform 308. It may be noted from waveform 302 that integration is stopped during the active portion of waveforms 304, 306, and 308 and is initiated on completion of the discharge pulse.

The noise equivalent temperature change of a bandwidth limited system will have a signal-to-noise ratio of at least 250. To accommodate this S/N the digital dynamic range should be at least 5 times or greater this value. Thus, a minimum count of 1250 in digital range is needed to meet this requirement. This corresponds to a 12 bit A/D converter. However, due to the utilization of ac coupling of the analog signal, the required dynamic range is at least twice the data range, and a 16-bit a/d converter is provided to give extra range for the dc restoration adjustment. Preamplifier 202 should preferably have a gain of at least 60 db and provide an output over +/− 15 volts. A bandwidth of dc−100 Khz is require for scans up to the rate of 50 scans/sec. With an appropriately low-noise preamplifier, the system will be noise limited by the detector.

The 16-bit output of converter 216 is applied to a buffer 220. Buffer 220 responds to a control signal on lead 221 from timing control 206. Buffer 220 acts to transmit the 16-bit input as a train of alternating high and low 8-bit data trains. A complete sequence of 8-bit high and low bits is applied to one of the ping-pong memories, say M1, and stored therein over a first complete scan, which may comprise 512 or 1024 pixels, for example. On the next scan, the 16-bit word comprised of alternating high and low 8-bit data trains is written into memory M2 while memory M1 reads out its contents to address bus 224 and data bus 226. In this manner, the ping-pong memories M1 and M2 are alternately written to and read out for data analysis.

The data produced are compared to a library of known values for materials likely to be observed on a pixel-by-pixel basis. Referring again to FIG. 7, the onboard monitor 128 may be used to display data on a scan-by-scan basis or as a two-dimensional map. Through the use of conventional pseudo-color processing, spectral data may be distinguished for various materials and conditions. Further processing may be done by the ground data processing computer 140. Geometric correction, data compression, data conversion and any other needed data processing procedures can be applied.

It may be seen that the present invention provides a high resolution radiometric imaging spectrometer suitable for low speed, low altitude aircraft. A complementary design of spectrometer, detectors, and data acquisition bandwidth and number of channels provides a system which is detector noise limited and results in all channels being acquired simultaneously to provide perfect band-to-band registration in a continuous pixel-by-pixel readout. Data outputs are in a form for processing by industry standard recorders and computers.

The foregoing invention provides a significant improvement over the state of the art with respect to providing high spectral and radiometric resolution. However, for some applications, it is desirable to provide greater resolution imaging and sensitivity capabilities. The foregoing invention utilizes a rotating polygon scan mirror to achieve a wide lateral field of view in what is known as a "whiskbroom" mode of operation. The energy scanned is directed by a Kennedy scanner to a parabolic mirror and then fed to a plurality of spectrometers. In whiskbroom operation much of the emitted light energy from a given part of the field of view is lost while the mirror is scanning across other areas. Such a system is not highly efficient in terms of its detection capability.

Another mode of operation, known as the "pushbroom" or "staring" mode, utilizes a fixed mirror centered on the nadir, and utilizes the motion of the vehicle to scan the scene. In the staring mode, swath is determined by the width of the detector array. Since all sensor elements of the array are exposed during an incremental motion of the vehicle, there is more time to collect photons, as compared to a scanning system. The longer integration time of staring arrays offers increased signal-to-noise ratio as compared to scanned systems. Further, elimination of mechanical scanning gives advantages in size, cost, and reliability over scanned systems. Still further improvement is obtained by using a two-dimensional detector array and an angularly disposed mirror.

The quantitative sensitivity benefit is approximately the square root of the ratio of the number of detectors in the respective arrays. For example, in comparing a two-dimensional array of 256×256 detectors to a line array of 256 detectors, the ratio of the number of detectors in the former to the number of detectors in the latter is 256:1. As the square root of 256 is 16, there is an improvement greater than an order of magnitude in the sensitivity of the system. The Kennedy imaging scanner described herein may be utilized in the staring mode by simply fixing the mirror at the nadir and aligning the slit in the cross-track direction during flight. Further improvement in sensitivity is obtained by using a two dimensional detector with appropriate storage capabilities and enhancing the capture area by an auxiliary mirror, to be described.

A further embodiment utilizes the scanning mode with a two-dimensional detector array operating with time delay integration (TDI). TDI is well known to those skilled in the art.

The resolution attainable is a function of the center-to-center distance between detector sensing elements. In a line array system, a center spacing of 10 $\mu$m has been used, while in two-dimensional arrays a center spacing of 30 $\mu$m has been achieved. It is more difficult to achieve close detector spacing in a two-dimensional array than in a line array.

Figure 10:
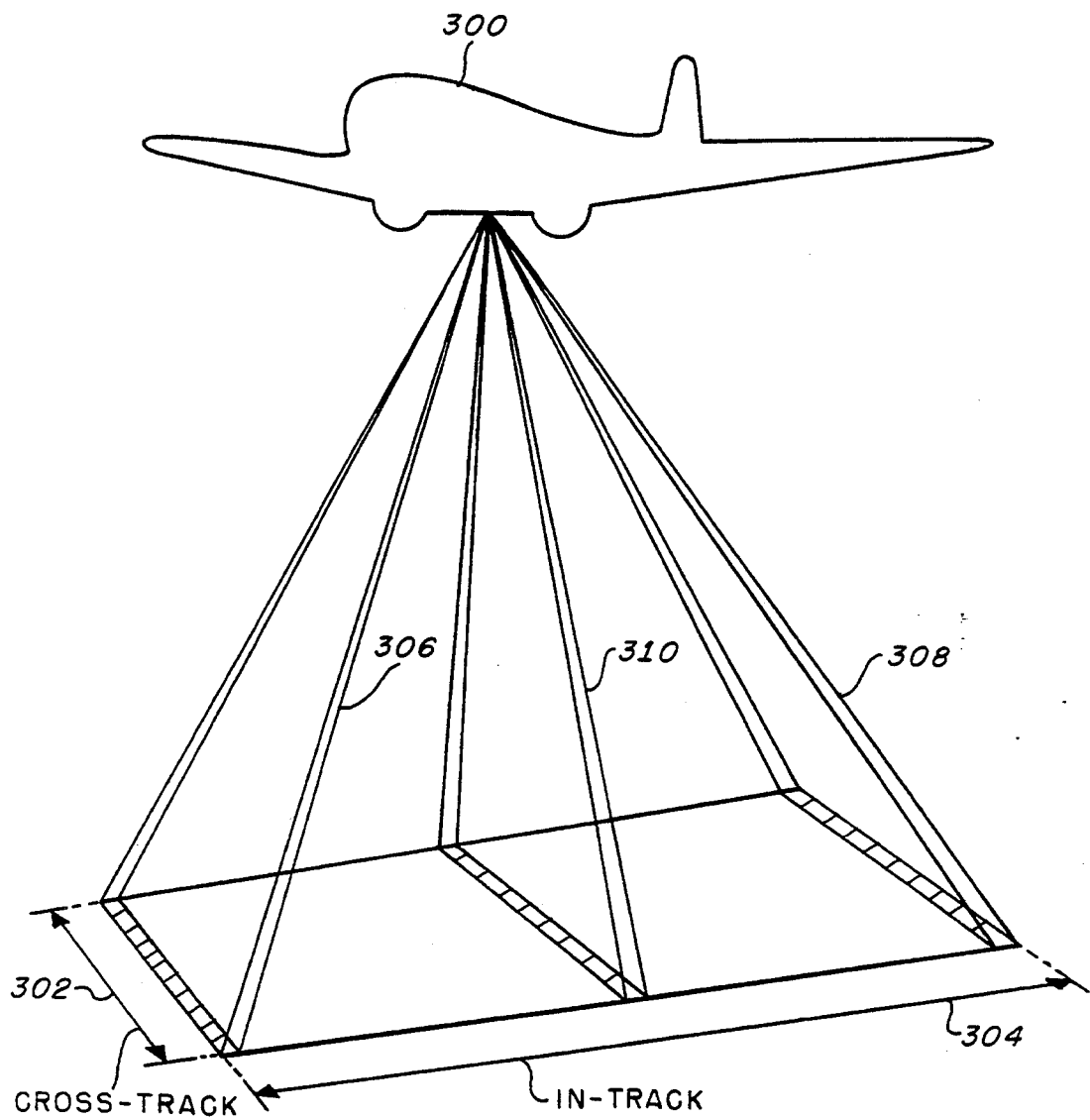
FIG. 10 is a pictorial representation of the field of view from an aircraft carrying a staring mode imaging spectrometer, showing the capability of forward and backward operation.

Referring now to FIG. 10, there is shown an airborne vehicle 300 flying over a field of view bordered by the in-track direction 304 and the cross-track direction 302. In a first embodiment of the staring mode, the "scan" mirror is oriented in a fixed position, and may be directed forwardly as at 306, rearwardly as at 308, or to the nadir 310.

Figure 11:
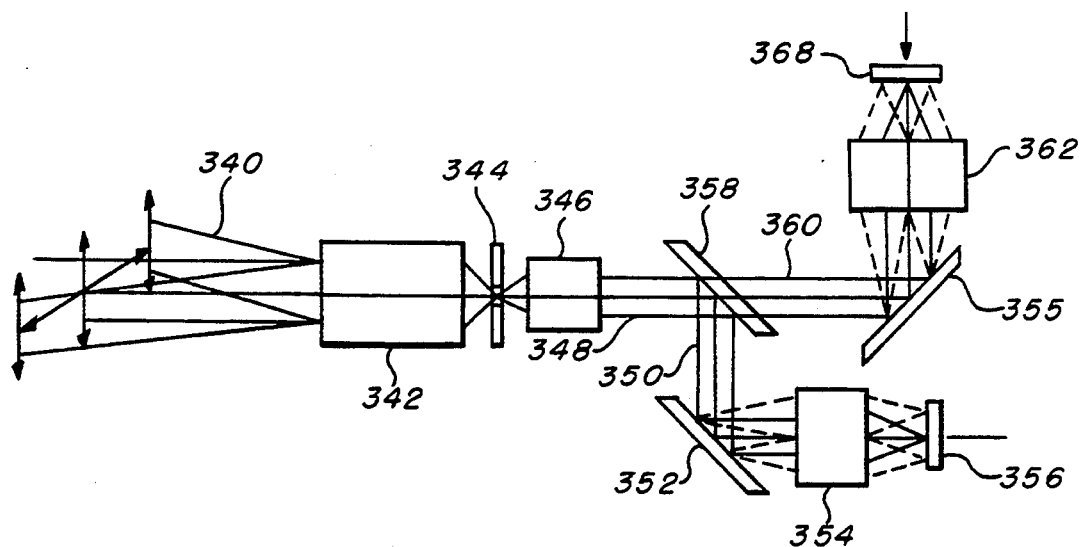
FIG. 11 is a schematic view of the invention in plan view with operation in the staring mode.

FIG. 11 is a block diagram of a stare-type configuration. The optical system is oriented so that the axis of the mirror is transverse to the flight direction. Thus, the optical beam 340 is presented along the cross-track direction. The mirror (not shown) is adapted for any desired angular disposition to provide a desired angle of reflection, and thus may be varied forwardly or rearwardly from the nadir. An optical collection assembly 342 receives a reflected image of the field of view and focuses the image upon a slit aperture 344 oriented with its length in the cross-track direction. The spectrometer comprises a collimator 346 for applying the focused image to a beam splitter 358, which reflects a first portion 350 of the spectral image to a grating 352 and transmits a second portion 360 of the spectral image to a second grating 355. Grating 352 reflects the focused spectral portion to a lens 354 and detector array 356, whose operation is described below. Similarly, grating 355 transmits beam 360 to lens 355 and detector array 368.

Figure 12:
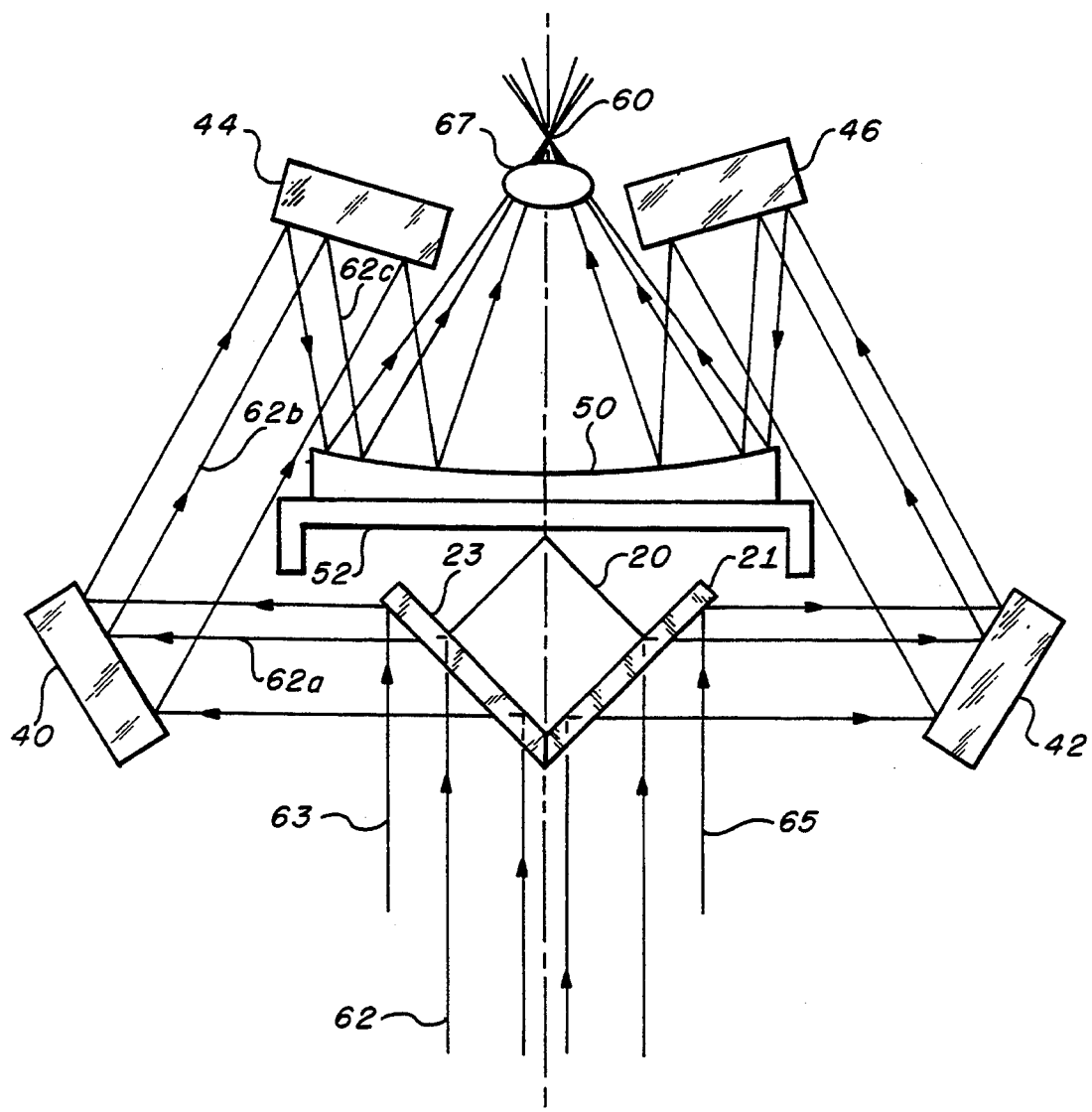
FIG. 12 is a view corresponding to FIG. 4, showing mirror modifications for operation in the staring mode.

FIG. 12 is a modified view of the collection optics shown in FIG. 4. It may be seen that the faces of mirror 20 do not transmit a sufficiently wide field of view to fill the aperture of parabolic mirror 50. The auxiliary mirrors 21, 23 affixed to the adjacent viewing faces of mirror 20 have an increased viewing area so as to fill parabolic mirror 50 and slit aperture 60. In this embodiment, the slit aperture may be widened for increased light-gathering power.

In a spectrographic system an image of the slit aperture is focused at the exit plane, e.g., the sensor array, at the wavelengths present in the light source. The wide field of view encompassed by a scanning mirror results in defocusing and a degraded image, since the spectral rays at some points are focused at points outside the detector surfaces. Thus, unless the spectrometer is corrected accordingly, the curvature of the field will result in defocusing at the ends of a planar linear detector array. Similarly, spherical aberrations and astigmatism may result in degraded bandpass, spatial resolution, and signal-to-noise ratio.

To modify the paraboloid collection optics as shown in FIG. 12, the line imaging capabilities are increased by applying an image corrector lens assembly 67 near the entrance slit of the spectrometer. Such corrector assemblies are well known in the art, hence need not be described in detail. One suitable corrector lens assembly utilizes a cylindrical optical element disposed with its cylindrical axes parallel to the length of the spectrometer slit, thereby to increase the spatial resolution of the telescope assembly along the slit.

Figure 13:
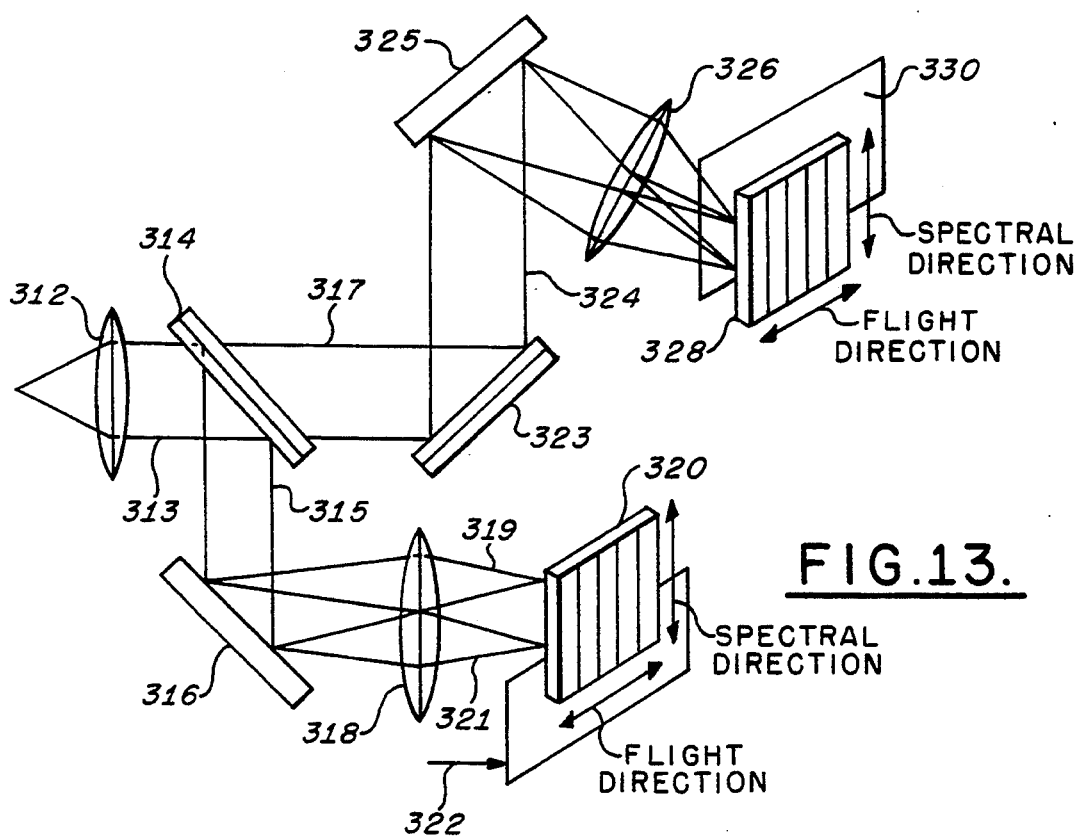
FIG. 13 is a schematic view showing the structure of the invention in partial isometric.

Referring now to FIG. 13 there is shown a further schematic diagram of the spectrometer optics of the present invention. The scanning optics have been previously described with respect to FIGS. 4 and 12. The term "light rays" and "radiation" are defined herein for convenience to cover any radiated or reflected energy in the electromagnetic spectrum from ultraviolet through visible light to thermal infrared.

Light rays exiting the slit aperture are collimated by a first lens 312 and applied to a beam splitter 314, which may be a dielectrically coated mirror, diffraction grating, or other equivalent device for reflecting a first portion of the applied radiation and transmitting a second portion thereof. The collimated beam 313 is thereby split into a first light beam 315 encompassing the range of 0.4–1.0 μm and a second light beam 317 covering 1–2.5 μm. First beam 315 is reflected by dichroic mirror 314 onto a first grating 316 where it is dispersed and applied to a second lens 318 for focusing upon a first detector array 320. Detector array 320 typically provides 256 sensor elements along the flight direction and 160 sensor elements in the spectral direction. The grating dispersion directions are orthogonal to the length of the slit aperture, and disposed so that a full spectrum 319, 321 is generated across the field of view. The ground image is captured by the detector arrays along the flight direction. Thus, each nominal 10 nm spectral band is captured by a given column of detector elements, providing 160 contiguous channels of spectral wavelength and intensity information.

A first order-separating filter 322 is disposed in the beams 319, 321 applied to detector array 320 to filter out any second order radiation induced by radiation in the 0.3–0.5 μm range impinging on the 0.4–1.0 μm detector array.

Dichroic mirror 314 transmits a second beam of radiation 317 in the 1–2.5 μm range. Beam 317 is reflected by a second dichroic mirror 323 in order to assure that both spectrometer paths have the same polarization characteristics by applying the beam through the same number of dielectrically coated reflecting surfaces. The reflected beam 324 is applied to a second grating 325 and focused on a second detector array 328 by a third lens 326. Detector array 330 operates in the same manner as described with respect to detector array 320.

A second order-separating filter 330 is interposed between lens 326 and detector array 328 to attenuate second order radiation at 0.9 μm and below.

The scanner system optics and spectrometer are configured similar to FIGS. 11 and 13, except that the mirror, of course, is fully rotatable and oriented with its axis of rotation in the cross-track direction. The length of the slit is oriented in the in-track direction. While the staring system described herein offers a swath of 256×1 pixels and a 7.3° lateral field of view by 0.03° longitudinal field of view, the scanning system provides coverage of 1024×256 pixels with a 29.3°×7.4° field of view.

Figure 14:
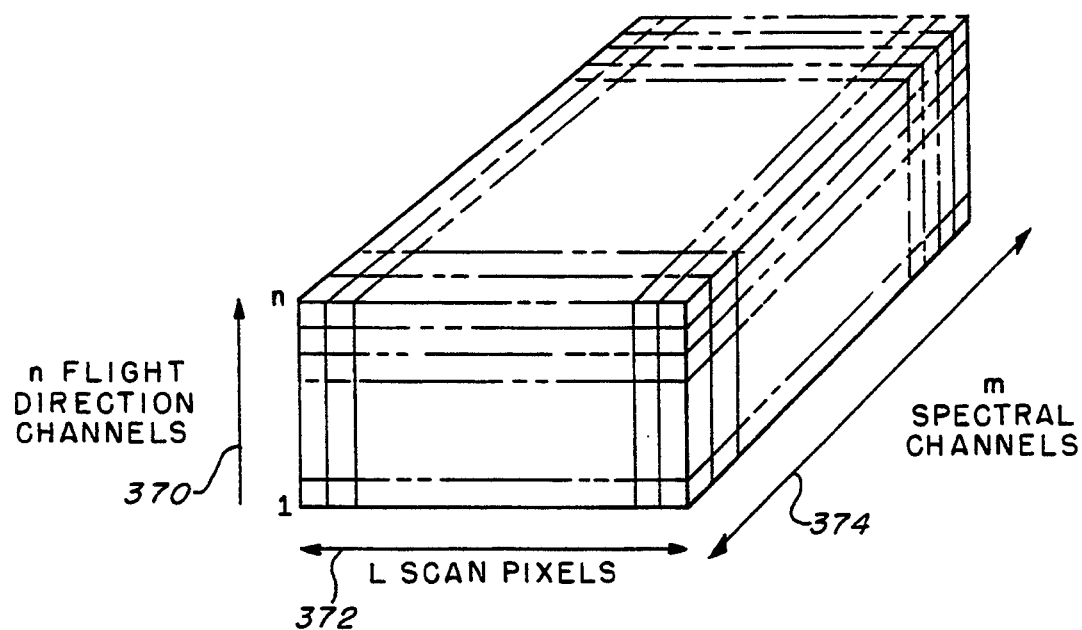
FIG. 14 is a conceptual view of the three-dimensional storage capability of the invention.

As shown in FIG. 14, the detector arrays are comprised of a matrix of sensor elements, the sensor elements being arranged in rows and columns. The number of rows correspond to a predetermined number of pixels, while the number of columns correspond to the number of spectral channels. The image is resolved by the spectrometer into a matrix of spectral channels as a function of the spatial image, each spatial increment along the cross-track direction corresponding to a continuous spectral distribution in the in-track direction. Each spectral channel also corresponds to a plurality of sensor elements, and each CCD sensor element stores an electrical signal representative of the predetermined band of wavelengths and a magnitude representative of the intensity of the radiation, corresponding to the temporal spatial image.

All stored signals in a given column are read out in parallel to analog-to-digital convertors as the mirror rotates and digitally transferred to a ping-pong memory, where one set of signals is recorded while another set is being acquired, in synchronism with motion of the aircraft.

Figure 15:
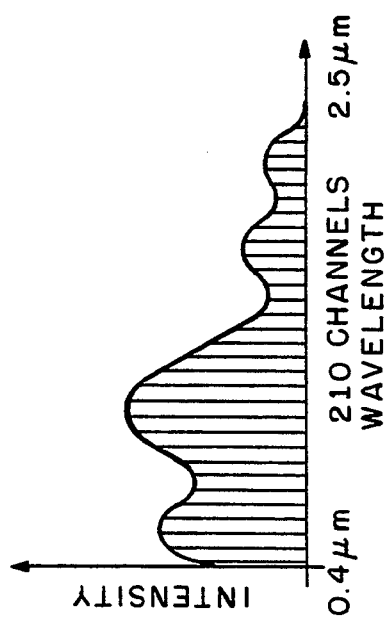
FIG. 15 is a pictorial representation of the output of the invention at a selected point on the image field.

FIG. 14 illustrates the three dimensional storage capability with TDI. As the aircraft traverses the scene, organized into N channels 370, the mirror scans in the cross-track direction over L pixels 372, and the indicated spectral wavelength and intensity is stored in M spectral channels 374. FIG. 15 shows a typical spectral characteristic for a given point in the field of view. The spectrum is divided into 210 channels ranging from 0.4 μm to 2.5 μm with a variable intensity. This range is illustrative and not to be construed as limiting, since detector arrays adapted to other frequency ranges may be utilized, as well as tailoring the spectrometer and optical collection assembly to the desired spectrum.

Figure 16:
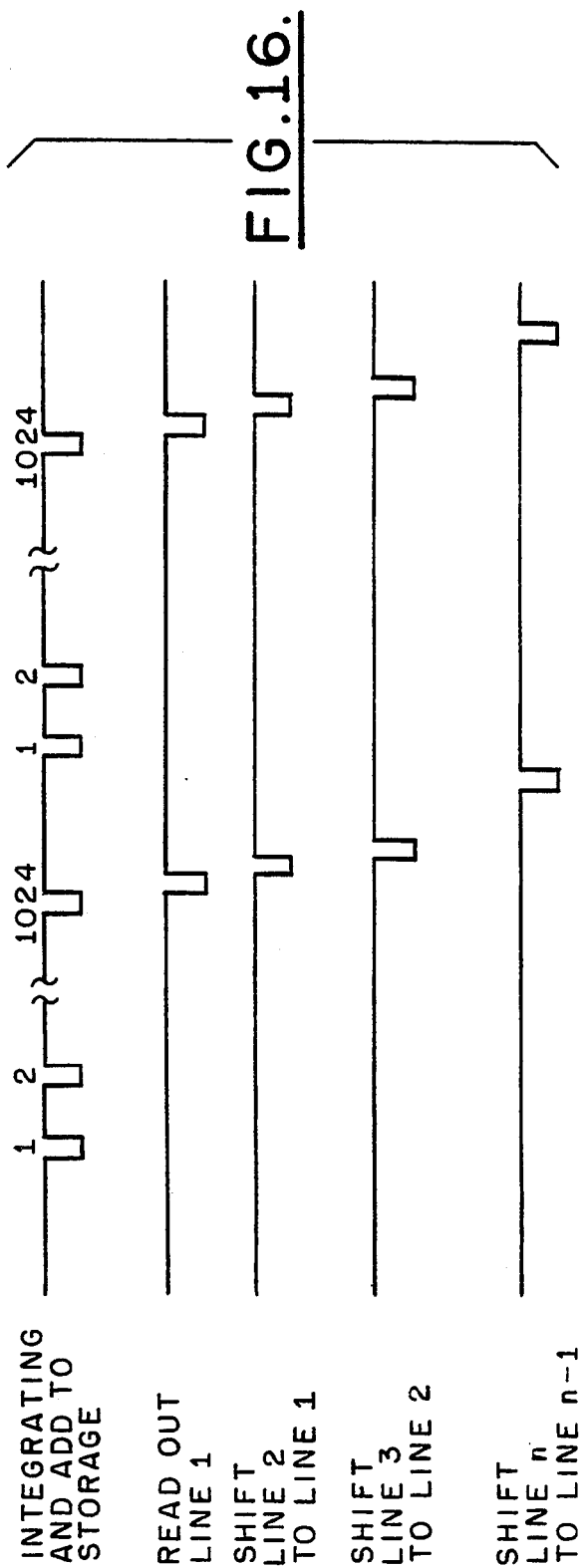
FIG. 16 is a diagram showing the timing sequence for the time-delay integration mode.

Referring to FIG. 16, the timing sequence for TDI operation is illustrated. The electrical signals are stored in the sensor elements row-by-row in the in-track direction. On each successive scan the stored electrical signals in a given sensor element are summed with the stored electrical signal of the preceding sensor element, so that the stored electrical signal from the end sensor of each column of the array is read out into memory. Each successive signal of a column is representative of the intensity of radiation from a given band of frequencies from a portion of the field of view and all the elements in a given column are time delay integrated in succession, periodically transferring the stored signals and reading out the end column in accordance with the velocity/height ratio of the aircraft. As shown in FIG. 16, there are n lines or rows in the detector array. Illustrated are 1024 pixel cycles. At each pixel interval, the signal stored in one line is summed with the signal stored in the preceding line. Thus, the end elements of all columns in line 1 are read out in parallel to memory. The stored values are representative of the wavelength and intensity of the spectral image, and are contemporaneous with the spatial pixel identity. In sequence, on the following pixel intervals, line 2 is shifted to line 1, line 3 is shifted to line 2, and line n is shifted to line n−1, this data all being stored in shift registers, which may be an integral part of the CCD or an external component, and at each interval a new wavelength and intensity is associated with a given pixel. The use of time delay and integration allows the detector elements 1 through n in a given column to see a given ground area or pixel, resulting in a total signal n times greater than a single detector. As the mirror scans, the elements in each row of each column are successively illuminated and stored. In this manner, random noise is minimized, the signal is amplified, and a three-dimensional output of wavelength, intensity, and spatial identity is provided in a continuous manner.

A feature of the present invention is provision for an on-board real-time calibration according to an absolute radiometric standard. Radiant energy produced by an opaque body may be characterized in terms of the spatial frequency and amplitude distribution. The radiance of an opaque body consists of that due to self emission, which is a function of the temperature and the surface properties of the body, and reflection of the incident radiation. Self emission may be calibrated against a black body at a known temperature, while reflectance (defined as the ratio of the radiant energy reflected by a body to that incident upon it) is calibrated against a white body of known reflectivity.

The energy distribution of a black body is a function of its temperature and may be specified solely by the absolute temperature. Thus, at 2000° K. the energy distribution approximates that of a tungsten incandescent lamp, while at 6000° K. the energy distribution approximates that of the sun. The total energy emitted from the surface of a black body can be calculated by the well-known Stefan-Bolzman law for a given absolute temperature. An ideal black body is a perfect absorbers, since it absorbs all wavelengths of the radiation incident upon it and does not reflect any radiation. The emissivity of a target is defined as the ratio of the radiation emitted by the body to that emitted by a black body at the same temperature.

A white reflective body may be calibrated at the ground station against a calibrated standard of irradiance, such as may be referenced to NTSC standards, to provide a correction to absolute radiance as a function of spectral frequency. Where the detector operates in the thermal region, i.e., wavelengths greater than 3 μm, a black body reference is required. Where operation is in the reflective region, i.e., wavelengths less than 3 μm, a white plate reflector is sufficient.

Calibration of detector sensitivity requires a knowledge of the dark current noise level. Further, a dark current measurement can be used to provide a reference radiation level. Prior art provided such a measurement by shading the optical path to exclude incident light from the detectors during a portion of the scan cycle. However, this approach was only useful with a scanning system, and did not allow for providing a dark current reference in a stare mode. Further, it provided a dark current measurement only at the extreme of the scan cycle, and hence was not representative of the noise levels in a system employing an array of detectors. The present invention provides a constant, real-time data set, independent of the scanner duty cycle, and provides a readout for each pixel of the detector array.

Figure 17:
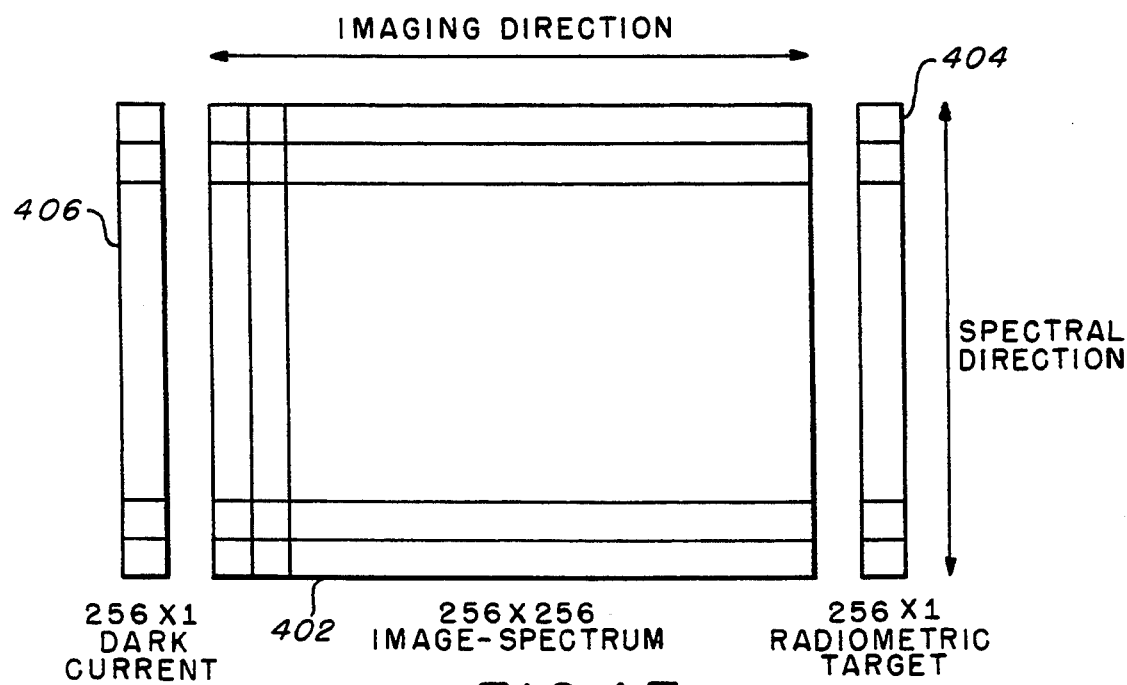
FIG. 17 is plan view of a detector array, showing the disposition of sensor cells for in-flight calibration.

FIG. 17 shows a conceptual view of a modification of the detector array to provide in-flight calibration by an absolute radiometric standard. Two additional columns of linear detector sensors 404, 406 are provided proximate to the image detection array 402. Light is excluded from column 406 so as to provide a dark current reference. Column 404 is illuminated spectrally by a radiometrically calibrated light source. Such illumination may be provided by an independent optical path or by optical fibers focused on the detector column. In operation, as the sensor elements of the two-dimensional detector array 402 are excited by the scan mirror, the outputs of the linear calibration arrays 404, 406 are temporally and sequentially sampled, so as to provide a substantially real time absolute calibration standard. Variations in sensor response spectrally may be compensated in post-flight data reduction.

Figure 18:
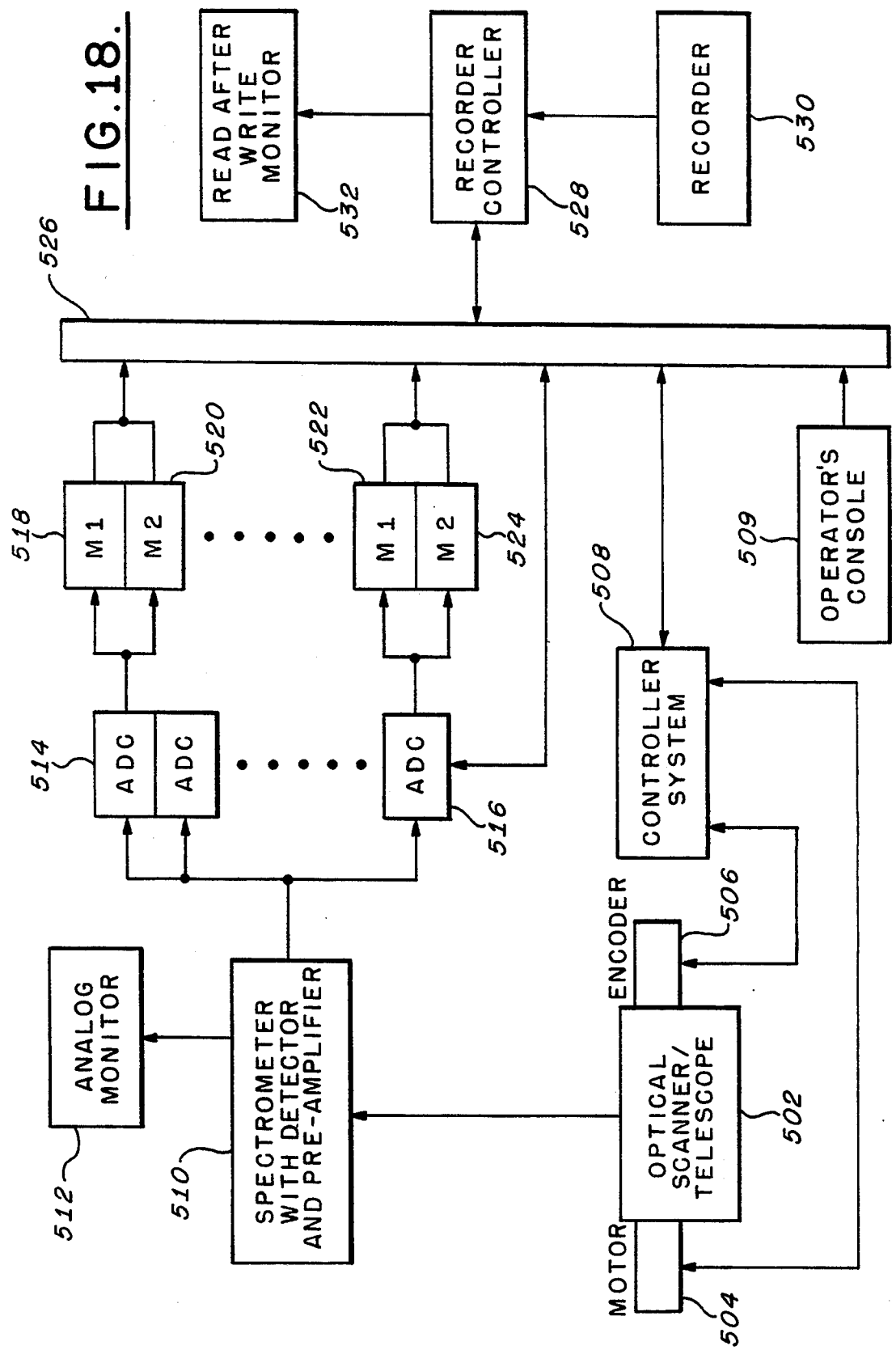
FIG. 18 is a block diagram, showing the relation between operational components of the imaging system.

FIG. 18 is an overall view of the imaging spectrometer system. Motor 504 drives the mirror of optical system 502 and is coupled to a positional encoder 506. Controller 508 provides control signals as input from operator's console 509. Bus 526 provides an interface for coupling the various subsystems. The radiation output is applied to spectrometer 510 and the signals therefrom in analog form are digitized by A/D convertors 514, 516 and coupled to ping-pong memories 518, 520. A selected spectrum may also be viewed in operation on monitor 512. The periodicity of scanning the detectors and storing their electrical outputs is controlled through bus 526 and a V/H input from the aircraft navigational system (not shown). If desirable, or a V/H signal is not available, a suitable signal may be manually input. The stored outputs are sequentially transferred to recorder controller 528 and applied to recorder 530 and monitor 532.

While the invention has been described in its preferred embodiments, it is to be understood that the words which have been used are words of description rather than limitation and that changes may be made within the preview of the appended claims without departing from the true scope and spirit of the invention in its broader aspects.

Embodiments of an invention in which an exclusive property or right is claimed is defined as follows:

1. A method for absolute radiometric calibration during data acquisition for a spectrographic detector array, said array arranged in a matrix of rows and columns, comprising:
   providing a first linear detector array proximate to a first column of said spectrographic detector array,
   providing a second linear detector array proximate to a second column of said spectrographic detector array and distal to said first column,
   providing cover means for denying illumination to said first linear detector array, thereby to establish a dark current reference,
   providing illumination from a radiometrically calibrated light source to said second linear detector array,
   sequentially sampling the detected output of said first and second linear detector arrays along said first and second columns in cooperation with spectral excitation of said spectrographic array, so that corresponding sensor elements of a given row of the spectrographic array are temporally calibrated by associated sensor elements of said linear detector arrays in said given row, and
   recording the signal levels developed by said linear detector arrays.

2. The method for absolute radiometric calibration as set forth in claim 1, wherein the step of providing illumination from a radiometrically calibrated light source includes the step of directing said light source to a reflective white plate, and directing reflected light from said white plate to said second linear detector array.

3. The method for absolute radiometric calibration as set forth in claim 2, further including the step of providing illumination from a spectrally calibrated light source to said reflective white plate.

4. A method for absolute radiometric calibration as set forth in claim 1, wherein said spectrographic detector array has a predetermined number of sensor elements in each column, and wherein said first and second columns of linear detector arrays have a one-to-one correspondence of sensor elements with said predetermined number of sensor elements.

5. Apparatus for absolute radiometric calibration of a spectrometer, comprising:
   an optical system for admitting reflected electromagnetic energy to said spectrometer,
   a rectangular array of detector elements coupled to receive said reflected electromagnetic energy,
   a first plurality of detector elements linearly disposed and bordering a first column of said array, said first plurality being masked from illumination,
   a second plurality of detector elements linearly disposed and bordering a second column of said array and distal to said first plurality of detector elements,
   a radiometrically calibrated light source,
   a reflective plate disposed to receive radiated energy from said light source, said plate having a predetermined coefficient of reflection as a function of wavelength,
   optical means for coupling reflected energy from said reflective plate to said second plurality of detector elements, and
   synchronization means for periodically and sequentially reading out a signal corresponding to the amplitude of said reflected energy applied to ones of said second plurality of detector elements.

6. Apparatus as set forth in claim 5, wherein said optical means for coupling reflected energy comprises a fiber optic conductor.

7. Apparatus as set forth in claim 5, wherein said optical means for coupling reflected energy comprises an optical path independent of said optical system for transferring reflected energy from said opaque target to said spectrometer.

8. Apparatus as set forth in claim 5, wherein said rectangular array is a staring plane array.

9. Apparatus as set forth in claim 5, further comprising a spectrally calibrated light source providing at least one predetermined wavelength of known radiance.

10. Apparatus as set forth in claim 5, wherein said optical system is operative in a scanning mode and said rectangular array is operative with time delay integration.

11. Apparatus a set forth in claim 5, further comprising an absorbing black body at a known temperature coupled to receive emissions from said radiometrically calibrated light source.

* * * * *